(12) United States Patent
Raman et al.

(10) Patent No.: US 11,666,933 B2
(45) Date of Patent: Jun. 6, 2023

(54) AUTOMATED PAINTING SYSTEM WITH ZERO-TURN RADIUS ROBOTIC BASE

(71) Applicant: RevolutioNice Inc., Belleville, NJ (US)

(72) Inventors: Sreenivas Raman, Park Ridge, NJ (US); Bill Tompkins, West Nyack, NY (US); TianHao Ye, Hoboken, NJ (US)

(73) Assignee: RevolutioNice Inc., Belleville, NJ (US)

( * ) Notice: Subject to any disclaimer, the term of this patent is extended or adjusted under 35 U.S.C. 154(b) by 1020 days.

(21) Appl. No.: 16/448,564

(22) Filed: Jun. 21, 2019

(65) Prior Publication Data

US 2019/0388925 A1    Dec. 26, 2019

Related U.S. Application Data

(60) Provisional application No. 62/688,230, filed on Jun. 21, 2018, provisional application No. 62/688,240, filed on Jun. 21, 2018.

(51) Int. Cl.
| | |
|---|---|
| *B60B 19/00* | (2006.01) |
| *B05B 12/14* | (2006.01) |
| *B05B 13/04* | (2006.01) |
| *B25J 5/00* | (2006.01) |
| *G05D 1/02* | (2020.01) |
| *B05B 15/625* | (2018.01) |

(52) U.S. Cl.
CPC ...... *B05B 12/1454* (2013.01); *B05B 13/0431* (2013.01); *B05B 15/625* (2018.02); *B25J 5/007* (2013.01); *B60B 19/003* (2013.01); *G05D 1/0272* (2013.01)

(58) Field of Classification Search
CPC ............................. B60B 19/003; B25J 9/0003
See application file for complete search history.

(56) References Cited

U.S. PATENT DOCUMENTS

| | | | | |
|---|---|---|---|---|
| 5,179,329 A | * | 1/1993 | Nishikawa ........... | G05D 1/0297 318/587 |
| 5,321,614 A | * | 6/1994 | Ashworth ............ | G05D 1/0227 318/587 |
| 7,441,298 B2 | * | 10/2008 | Svendsen ................ | A47L 9/009 15/49.1 |
| 8,239,992 B2 | * | 8/2012 | Schnittman ........... | A47L 11/302 15/52.1 |
| 8,584,307 B2 | * | 11/2013 | Won ..................... | G05D 1/0227 15/340.1 |

(Continued)

*Primary Examiner* — Kevin Hurley
*Assistant Examiner* — Michael R Stabley
(74) *Attorney, Agent, or Firm* — Brient IP Law, LLC

(57) ABSTRACT

In various embodiments, a zero-turn radius robotic base may comprise a substantially rectangular (e.g., rectangular) base portion that comprises a plurality of wheels. In various embodiments, the plurality of wheels are configured to support the robotic base adjacent a support surface (e.g., the ground, a suitable flooring surface within a building, etc.). In some embodiments, the robotic base comprises a first and second driving wheel and a plurality of stability wheels. In some embodiments, an axis of rotation of the first and the second driving wheel are collinear. In various embodiments, the plurality of stability wheels are spaces apart from the axis of rotation of the first and second driving wheels to provide stability to the robotic base.

10 Claims, 11 Drawing Sheets

(56) References Cited

U.S. PATENT DOCUMENTS

| | | | |
|---|---|---|---|
| 9,020,637 B2* | 4/2015 | Schnittman | G05D 1/0227 |
| | | | 382/106 |
| 9,752,652 B2* | 9/2017 | Moore | F16H 1/10 |
| 9,815,190 B2* | 11/2017 | Kim | A47L 9/2894 |
| 9,966,810 B2* | 5/2018 | Johnson | F16C 19/30 |
| 10,027,198 B2* | 7/2018 | Johnson | H02K 7/116 |
| 10,141,807 B2* | 11/2018 | Biro | H02K 3/28 |
| 10,227,872 B2* | 3/2019 | Hilton | F01C 19/025 |
| 10,400,600 B2* | 9/2019 | Hutsler | F16H 57/021 |

\* cited by examiner

US 11,666,933 B2

AUTOMATED PAINTING SYSTEM WITH ZERO-TURN RADIUS ROBOTIC BASE

CROSS-REFERENCE TO RELATED APPLICATIONS

This application claims priority to U.S. Provisional Patent Application Ser. No. 62/688,240, filed Jun. 21, 2018, entitled, "AUTOMATED PAINTING SYSTEM WITH ZERO-TURN RADIUS ROBOTIC BASE," and U.S. Provisional Patent Application Ser. No. 62/688,230, filed Jun. 21, 2018, entitled, "PIVOTING SPRAY HEAD FOR AUTOMATED PAINTING SYSTEMS," the disclosures of which are hereby incorporated by reference in their entirety.

BACKGROUND

Painting can be a labor-intensive, costly process. Additionally, traditional painting techniques often result in excessive waste (e.g., in terms of paint consumption, brushes, etc.) or result in the release of potentially hazardous chemicals into the air (e.g., via paint spraying). Accordingly, there is a need for improved systems and methods that address these and other needs.

SUMMARY

An autonomous mobile paint spraying robot, in various embodiments, comprises: (A) a wheeled base configured to support the autonomous mobile paint spraying robot adjacent a support surface, wherein the wheeled base comprises: (1) a first drive wheel disposed adjacent a central portion of the robotic frame, the first drive wheel being spaced apart from a center of rotation of the wheeled base and having a first axis of rotation that intersects the center of rotation; (2) a second drive wheel disposed adjacent the central portion of the robotic frame, the second drive wheel being spaced apart from the center of rotation of the wheeled base and having a second axis of rotation that intersects the center of rotation and is collinear with the first axis of rotation; and (3) a plurality of stability wheels disposed about an outer portion of a frame of the wheeled base; (B) a paint sprayer support system comprising at least one vertical support, wherein the at least one vertical support comprises: (1) a first vertical support that extends from the wheeled base and is perpendicular to the support surface; and (2) a second vertical support configured to slide relative to the first vertical support in a telescoping manner; (C) at least one paint sprayer adjacent the at least one vertical support and configured to translate vertically along a track defined by the second vertical support, the at least one paint sprayer comprising a worm gear drive assembly configured to adjust an angle of the at least one paint sprayer relative to the at least one vertical support; and (D) a computer controller configured for causing the autonomous mobile paint spraying robot to paint a wall by painting a series of adjacent vertical swaths by activating the at least one paint sprayer to spray paint along each vertical swath of the series of adjacent vertical swaths at a desired speed by causing vertical motion of the at least one paint sprayer relative to the wheeled base by: (1) causing the second vertical support to slide vertically relative to the first vertical support at a first speed to a height that corresponds to a height of the wall; (and) causing the at least one sprayer to slide relative to the second vertical support at a second speed such that the first speed and second speed are synchronized to the desired speed and the at least one sprayer travels a linear path from a base of the second vertical support adjacent a base of the wall to a top portion of the second vertical support adjacent a top portion of the wall.

A zero turn-radius robotic base comprising: (A) a substantially rectangular base frame; (B) a plurality of stability wheels disposed adjacent an outer face of the substantially rectangular base frame; (C) a first driving wheel disposed at least partially within the substantially rectangular frame; and (D) a second driving wheel disposed at least partially within the substantially rectangular frame and spaced apart from the first driving wheel, wherein: (1) the first driving wheel is spaced apart from a center of rotation of the substantially rectangular base frame and has a first axis of rotation that intersects the center of rotation; (2) the second driving wheel is spaced apart from the center of rotation of the substantially rectangular base frame and has a second axis of rotation that intersects the center of rotation; and (3) the first axis of rotation is substantially collinear with the second axis of rotation.

BRIEF DESCRIPTION OF THE DRAWINGS

Various embodiments of an automated painting robot are described below. In the course of this description, reference will be made to the accompanying drawings, which are not necessarily drawn to scale, and wherein.

DETAILED DESCRIPTION OF VARIOUS EMBODIMENTS

Figure 1B:
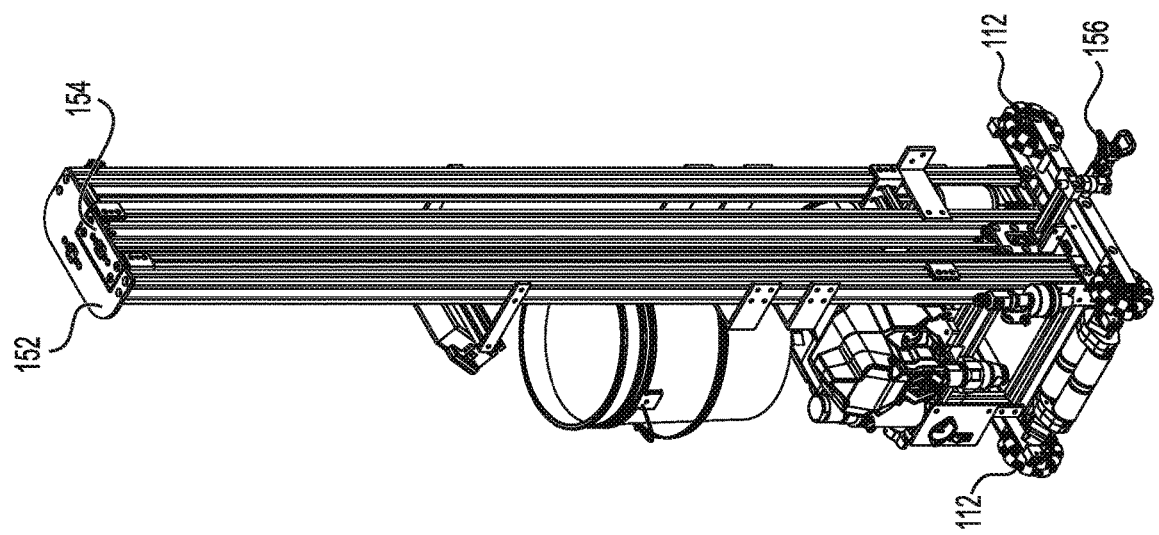
FIGS. 1A-1B depict a perspective view of an automated mobile paint robot 100 according to a particular embodiment.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

An automated mobile paint robot (such as the automated mobile paint robot shown in FIGS. 1A, 1B, 2A, and 2B) may be configured to paint a wall of a room by causing a paint sprayer 156 to spray a series of discrete, vertical swaths having a defined width along an entire length of the wall. The automated mobile paint robot may, for example, be configured to: (1) cause the sprayer to spray a first complete vertical swath of the wall (e.g., from floor to ceiling or from ceiling to floor); (2) after spraying the first vertical swath of the wall, cause the automated mobile paint robot to drive one swath width along the wall (e.g., while maintaining a substantially fixed distance from the wall); (3) cause the sprayer to spray a second complete vertical swath of the wall (e.g., from floor to ceiling or from ceiling to floor) that is adjacent to (e.g., abutting, at least partially overlapping, etc.) the first swath; and (4) so on until the automated mobile paint robot has sprayed a sufficient number of adjacent vertical swaths such that the entire wall has been painted.

As may be understood from FIGS. 1A, 1B, 2A, and 2B, structural limitations of the automated mobile paint robot may limit the paint robot's ability to paint at least a portion of the wall adjacent the ceiling and the floor. In the embodiment shown in FIGS. 1A, 1B, 2A, and 2B, for example, a fixed sprayer 156 that is oriented such that the fan of the sprayer is substantially perpendicular (e.g., perpendicular) to the wall surface may be unable to reach the very top (e.g., adjacent the ceiling) and/or very bottom (adjacent the floor) portions of the wall. In some embodiments, such a limitation may result in a painted wall that has unpainted gaps between: (1) an upper limit of the paint sprayer's reach and the ceiling; and/or (2) a lower limit of the paint sprayer's reach and the floor.

In still other embodiments, a paint robot having a sprayer that is substantially fixed in an orientation in which the spray fan is perpendicular to the wall surface may be ineffective at painting portions of a wall that are not substantially flat (e.g., flat). These portions may include one or more protrusions and/or recesses such as, for example: (1) a chair rail or other suitable piece of molding; (2) one or more window ledges and/or sills; (3) one or more exit signs; (4) one or more thermostats; (5) etc. As such, it may be desirable to incorporate an articulating spray head (e.g., a pivoting sprayer) into an automated mobile painting system (e.g., such as the paint robot shown in FIGS. 1A, 1B, 2A, and 2B) in order to, for example, paint the upper and lower portions of the wall by angling the paint sprayer to paint over and/or under the various protrusions which may exist on the wall as discussed above.

Figure 6:
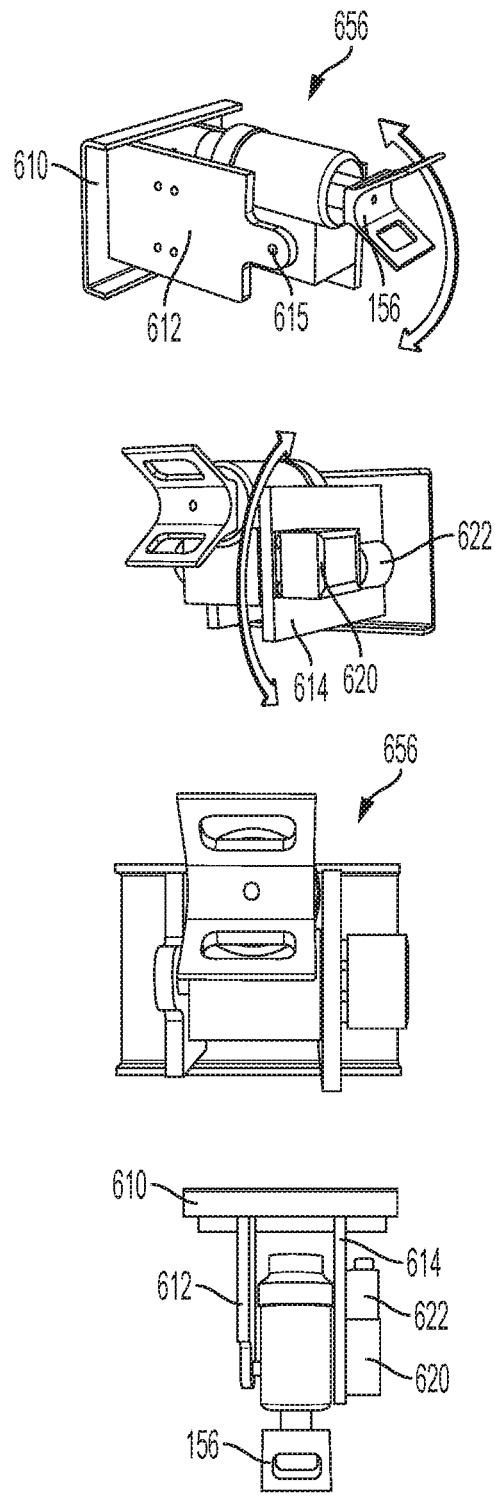
FIG. 6 depicts a pivoting spray head according to various embodiments.

FIG. 6 depicts a pivoting spray head according to a particular embodiment. As may be understood from FIG. 6, the pivoting sprayer may be configured to angle upwards or downwards with at least about a 180-degree range of motion. For example, in a particular embodiment, the pivoting spray head is configured to angle upwards at least about 90 degrees (e.g., 90 degrees) and downwards at least about 90 degrees (e.g., 90 degrees) from a position in which the pivoting spray head is substantially perpendicular to a surface being sprayed (e.g., a wall).

In particular embodiments, the pivoting spray head comprises a worm gear drive assembly that is configured to articulate the pivoting spray head to a desired angle. In some embodiments, the worm gear drive assembly is configured to articulate the spray head of a rate of at least about 60 RPM. In various embodiments, a computer controller is configured to operate the worm gear drive assemble to adjust the angle of the pivoting spray head relative to the paint robot (e.g., or wall). In still other embodiments, the pivoting spray head comprises any other suitable mechanism for adjusting an angle of the pivoting spray head (e.g., stepper motor, etc.).

In various embodiments, a computer controller is configured to programmatically adjust an angle of the pivoting spray head such that the pivoting spray head is configured to paint floors, ceilings, over and under protrusions, etc. In some embodiments, the computer controller is configured to cause the pivoting spray head to oscillate while painting in order to apply a texture to a painted surface.

In particular embodiments, movement of the automated mobile paint robot is achieved using one or more wheels disposed adjacent the mobile paint robot's base. As may be understood in light of this disclosure, in particular embodiments, a high accuracy of movement of the mobile paint robot may be required, for example, to ensure that the paint robot has travelled an appropriate distance between painting vertical swaths such that adjacent vertical swaths sufficiently overlap to result in a consistent application of paint over the entire wall.

In some embodiments of a robotic wheel base, the base relies on skipping and/or slipping of one or more of the wheels used to support the base adjacent a support surface. For example, treads and skid-steers may rely on skidding, while other driving mechanisms such as the use of Omni-wheels or Mecanum wheels bases may rely on slippage. In various embodiments, such drive bases that rely on slipping and/or skidding may be unreliable for accurately mapping a surface over which the robot base is driving (e.g., via one or more dead reckoning techniques).

In particular, floor mapping based on the movement of the robotic base may require, for example, a constant flow of data coming from the wheels to calculate the robot's position, speed, and distance traveled. Various systems may utilize one or more encoders on at least one of the one or more wheels in order to attempt to measure such data. One or more encoders on a slipping or skidding wheel may result in one or more breaks in a code and/or data stream as the wheel stops turning in a skid. Drive bases that rely on skipping and/or sliding may also have other limitations such as, for example: (1) causing damage to floor surfaces; (2) pulling and/or fraying carpeted surface; (3) getting tarps, drop cloths, and other materials caught up in the robotic base's drive mechanism.

Certain types of wheels that rely on slipping may have other limitations. Omni and Mecanum wheels may, for example, move at disproportional rates depending on an angle at which they are mounted. As such, the use of encoders with such wheels may result in an inaccurate floor mapping. Various embodiments of a robotic base that addresses one or more issues related to slipping and/or skidding while maintaining a center of rotation of the robotic base about its center are discussed more fully below.

MORE DETAILED DISCUSSION

Mobile Paint Robot

Figure 1A:
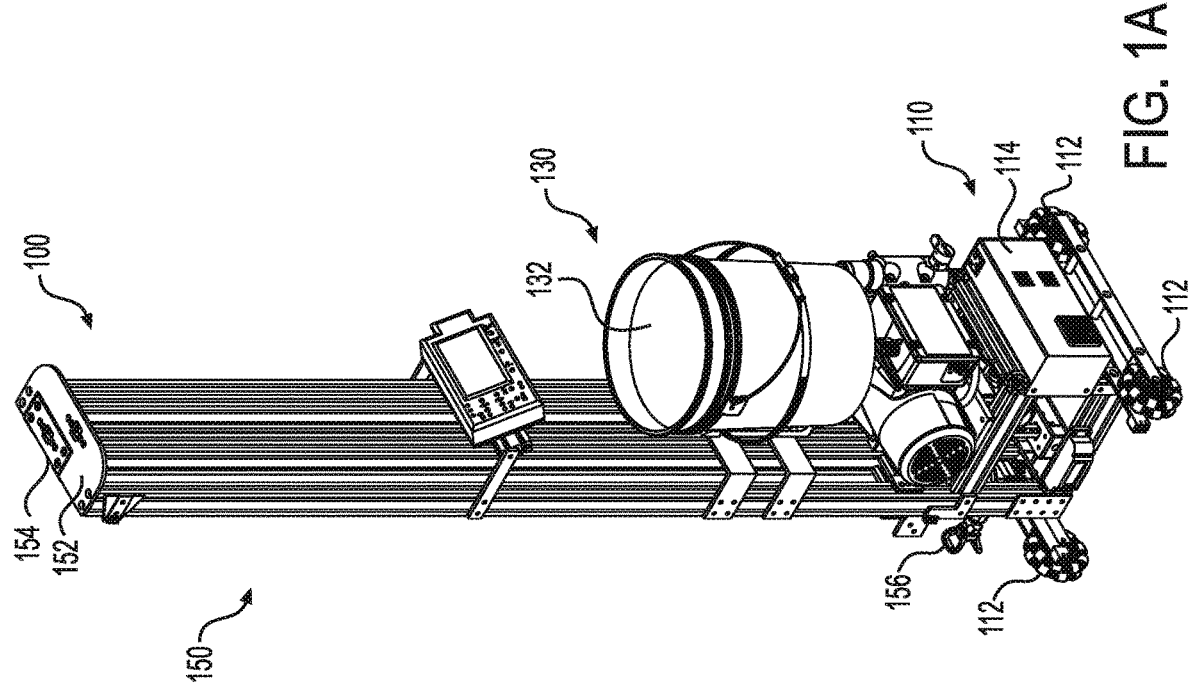

FIGS. 1A and 1B depict an autonomous mobile paint robot 100 according to a particular embodiment. In the embodiment shown in this figure, the autonomous mobile paint robot 100 comprises: (1) a base portion 110; (2) a paint caddy assembly 130; and (3) a paint sprayer support system 150. These features will be discussed more fully below.

Base Portion

As may be understood from FIGS. 1A and 1B, the autonomous mobile paint robot 100 comprises a substantially rectangular (e.g., rectangular) base portion 110 that comprises a plurality of wheels 112 (e.g., four wheels in the embodiment shown in FIGS. 1A and 1B). In various embodiments, the plurality of wheels are configured to support the autonomous mobile paint robot 100 adjacent a support surface (e.g., the ground, a suitable flooring surface within a building, etc.).

Figure 2B:
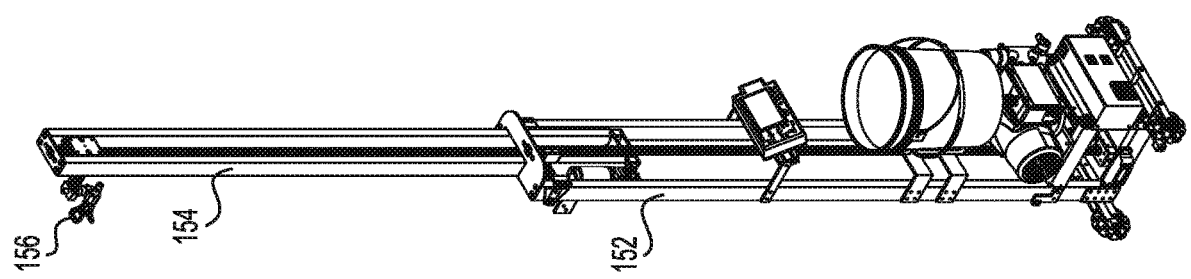
FIGS. 2A-2B depict the automated mobile paint robot 100 of FIG. 1 with the paint sprayer in an extended position.
Figure 2A:
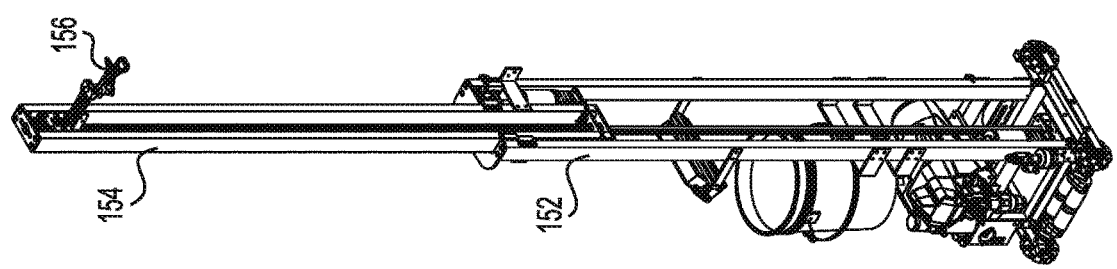
Figure 3:
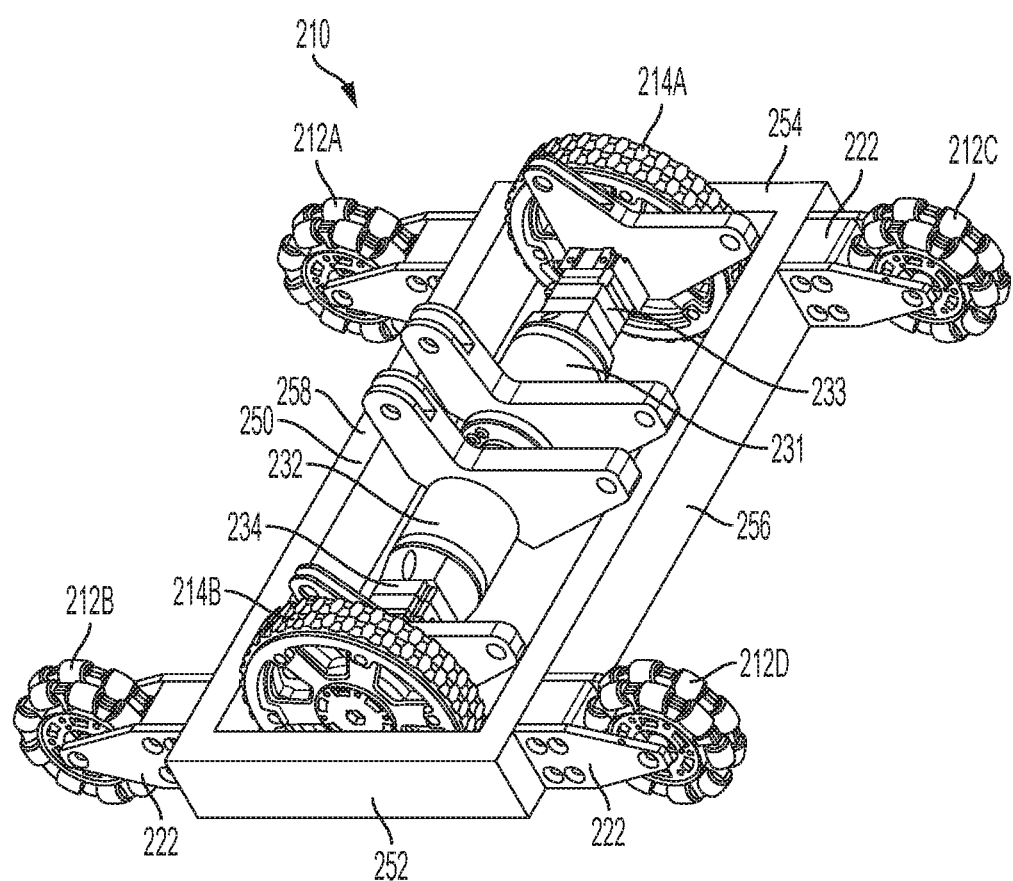
FIG. 3-5 depict a zero-turn radius robotic base according to various embodiments, which may be used in the context of an automated mobile paint robot, such as the automated mobile paint robot shown in FIGS. 1A, 1B, 2A, and 2B.
Figure 4:
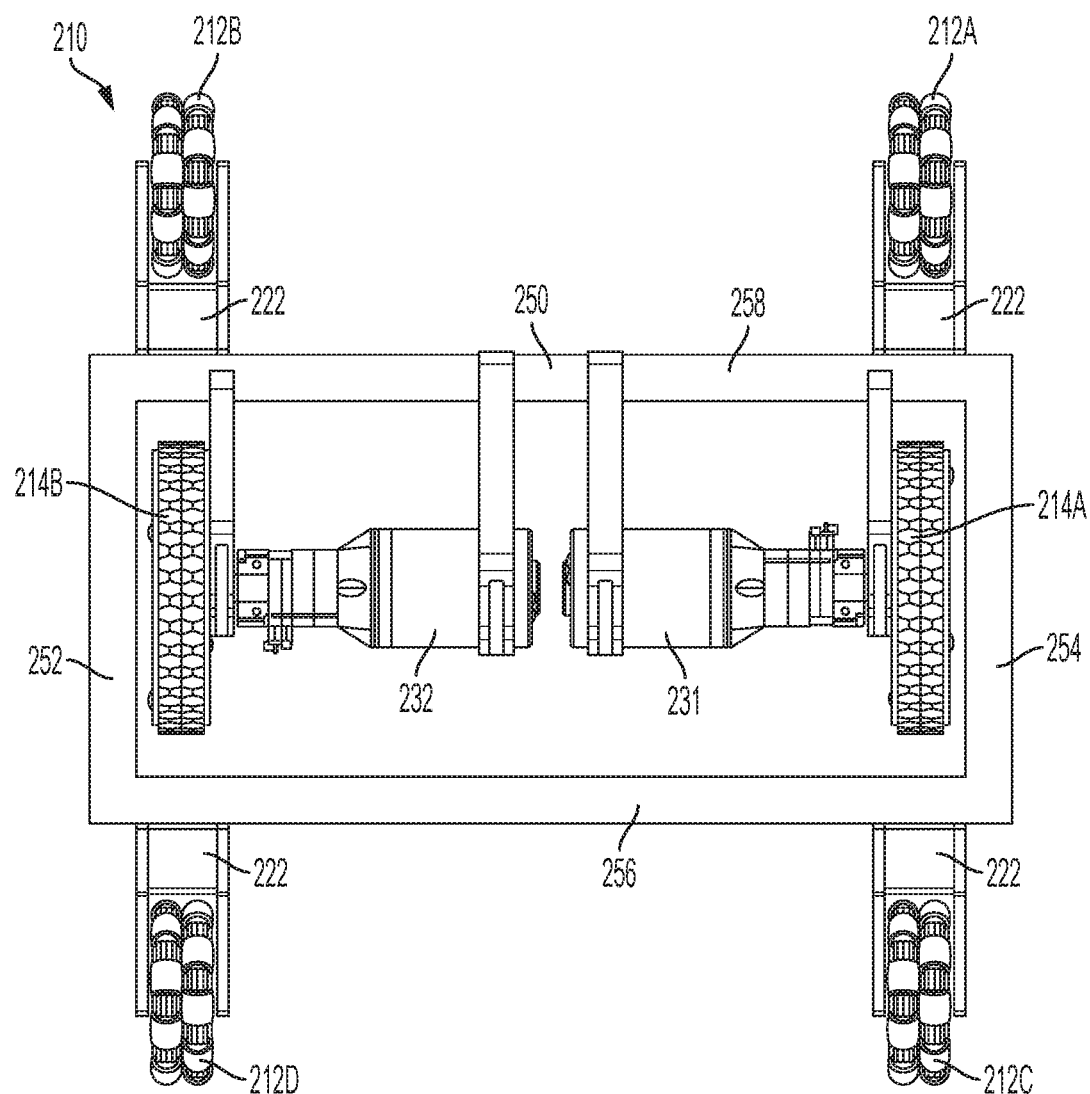
Figure 5:
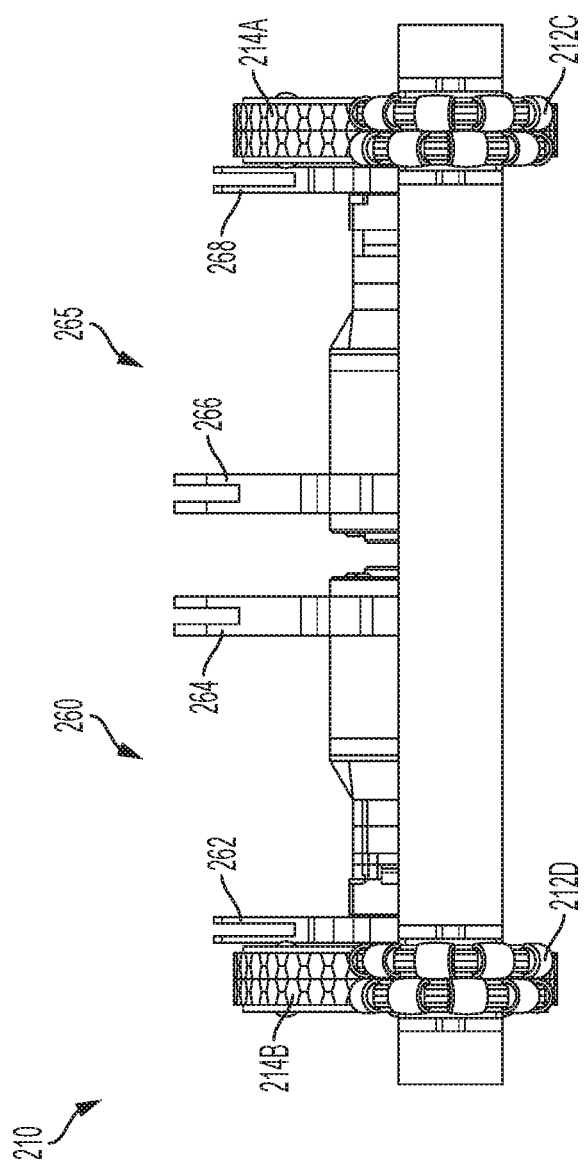

FIG. 3-5 depict a robotic driving base 210 according to yet another embodiment. In particular embodiments, the robotic base depicted in FIGS. 3-5 is configured to provide a stable platform for the autonomous paint robot shown in FIGS. 1 and 2 (e.g., or any other suitable wheeled vehicle), while providing a center of rotation at the base's center. In particular embodiments, the robotic base shown in FIG. 3-5 is substantially symmetrical, configured to move in both directions, and further configured to follow along complex wall surfaces (e.g., in order to facilitate application of paint by the paint robot by maintaining a consistent distance from the wall). In various embodiments, the robotic base may, for example, be configured to agilely navigate along a wall while avoiding any protrusions, accounting for any cavities, etc.

In the embodiment shown in these Figures, the base portion robotic driving base 210 is substantially rectangular (e.g., has a substantially rectangular frame) and comprises four stability wheels 212A, 212B, 212C, 212D disposed adjacent an outer portion of the frame. As may be understood from FIG. 3, the four stability wheels 212A, 212B, 212C, 212D are configured to provide balance and stability to the robotic base. The four stability wheels 212A, 212B, 212C, 212D are mounted to the robotic frame in respective, fixed positions. In particular embodiments, the four stability wheels 212A, 212B, 212C, 212D are free-spinning and configured to provide support to the robotic base while enabling the robotic base to move forward and backwards, and to rotate to the right or to the left.

In the embodiment shown in this figure, the four stability wheels comprise Omni wheels (e.g., one or more poly wheels) each comprising one or more discs disposed about its circumference which are perpendicular to the turning direction of the respective wheel.

In still other embodiments, the four stability wheels 212A, 212B, 212C, 212D may comprise any other suitable type of wheel (e.g., one or more casters, one or more standard wheels, one or more Omni wheels etc.). In the embodiment shown in these figures, the four stability wheels 212A, 212B, 212C, 212D comprise four wheels. It should be understood that in other embodiments, the four stability wheels 212A, 212B, 212C, 212D (e.g., the one or more stability wheels) may comprise any other suitable number of wheels and/or treads for supporting the robotic base and providing stability to the robotic base.

As may be understood from FIGS. 3-5, the robotic driving base robotic driving base 210 further comprises a first driving wheel 214A and a second driving wheel 214B. In the embodiment shown in these figures, the first and second driving wheels 214A, 214B comprise treaded wheels. In particular embodiments, the axis of rotation of the first driving wheel 214A is substantially co-linear (e.g., collinear) with the axis of rotation of the second driving wheel. In further embodiments, the axes of rotation of the first and second driving wheels extend through a center of the robotic base (e.g., a center of mass, a center of rotation, a physical center, etc.). In the embodiment shown in this figure, the center of rotation of the robotic base corresponds to a center of the robotic base, and the first and second driving wheels 214A, 214B are spaced apart from the center of rotation of the base (e.g., equally spaced apart from). As such, the robotic base is configured turn about its center of rotation with substantially zero-turn radius (e.g., zero turn-radius).

In particular embodiments, each of the first and second driving wheels 214A, 214B comprises an independent suspension. In various embodiments, the independent suspensions may be configured to enable the robotic base to traverse rough surfaces while maintaining a stable platform.

In some embodiments, the autonomous mobile paint robot 100 comprises a distributed controller (e.g., computer controller) configured to control operation of one or more motors for powering operation of the first and second driving wheels 214A, 214B. In some embodiments, each respective wheel of the first and second driving wheels 214A, 214B is controlled by a respective distributed controller. In various embodiments, each distributed controller is configured to cause the one or more motors to operate each respective wheel of the first and second driving wheels 214A, 214B cause the autonomous mobile paint robot 100 to roll across the support surface (e.g., in any suitable direction). As may be understood by one skilled in the art, the distributed controller arrangement for the first and second driving wheels 214A, 214B may enable the system (e.g., a master control system) to operate each of the plurality of wheels independently at one or more different velocities, one or more different accelerations, and/or one or more different directions.

In various embodiments, each of the first and second driving wheels 214A, 214B comprise an encoder configured to measure movement of each of the first and second driving wheels 214A, 214B. As such, the system may be configured to accurately map the movement of the robotic base through data received from the encoders. The system may, for example, use one or more dead reckoning techniques based on speed and position data received from the first and second driving wheels 214A, 214B in order to map a path traveled by the robotic base. As such, the robotic base may be configured to follow a particular path or along a wall in one direction and then reverse direction to follow the same bath back to an initial stating position.

In some embodiments, the robotic base comprises one or more IR sensors, laser scanners, LIDAR devices, or other suitable distance scanners for measuring a distance between the robotic base and a vertical surface (e.g., a wall). In various embodiments, the system is configured to use data received from one or more sensors to maintain the robotic base a fixed distance from the wall as the robotic base traverses along the wall.

In particular embodiments, the first and second driving wheels 214A, 214B are oriented substantially perpendicularly to the direction of paint spray by the paint robot. In this way, the robotic base is configured to drive forward or backward along the wall in between spraying of vertical swaths by the autonomous paint robot.

In particular embodiments, as may be understood from FIG. 3, the robotic driving base 210 comprises: (1) a substantially rectangular (e.g., rectangular) base frame 250; (2) a plurality of stability wheels 212A, 212B, 212C, 212D operably coupled to the base frame 250; and (3) a first driving wheel 214A and a second driving wheel 214B disposed at least partially within the base frame 250. As shown in FIG. 3, the base frame 250 comprises a front base frame member 252 (e.g., which may include a substantially rigid frame member), a 226 and a second side base frame member 258 that extend perpendicular from opposing ends of the front base frame member 252, and a rear base frame member 254 that is substantially parallel to the front base frame member 252. As may be understood from FIG. 3, the front base frame member 252, the rear base frame member 254, the first side base frame member 256 and the second side base frame member 258 form the base frame 250.

As further shown in FIG. 3, each of the plurality of stability wheels 212A, 212B, 212C, 212D is operably coupled to a respective stability wheel mount 222. Each respective stability wheel mount 222 extends perpendicularly from each of the first side base frame member 256 and the second side base frame member 258 adjacent the front base frame member 252 or the rear base frame member 254. As may be understood from this Figure, the position of each of the plurality of stability wheels 212A, 212B, 212C, 212D is such that each respective stability wheel is spaced apart from the axis of rotation of the first and second driving wheels 214A, 214B. In various embodiments, this configuration of driving and stability wheels may provide stability to any suitable robot that is utilizing the robotic base (e.g., such as the robot shown in FIGS. 1 and 2. As may be understood from FIGS. 1 and 2 (e.g., 1A, 1B, 2A, and 2B), when in a fully extended position, the paint robot may be relatively tall while still having a compact (e.g., small profile) base portion. As such the distance between the plurality of support wheels and the axis of rotation of the driving wheels may provide a stable support base which may, for example, reduce a likelihood of tipping by the robot.

In some embodiments, the first driving wheel 214A is operably coupled to a first driving wheel drive motor 231, which may, for example, be configured to drive the first driving wheel 214A (e.g., through operation of the first driving wheel drive motor 231). In some embodiments, the first driving wheel drive motor 231 is operably coupled to a first motor controller 233, which may for example, be configured to control operation of the first driving wheel drive motor 231 in order to, for example: control a rotation speed of the first driving wheel 214A, control a rotation direction of the first driving wheel 214A, etc. Similarly, in various embodiments, the second driving wheel 214B is operably coupled to a second driving wheel drive motor 232, which may, for example, be configured to drive the second driving wheel 214B (e.g., through operation of the second driving wheel drive motor 232). In some embodiments, the second driving wheel drive motor 232 is operably coupled to a second motor controller 234, which may for example, be configured to control operation of the second driving wheel drive motor 232 in order to, for example: control a rotation speed of the second driving wheel 214B, control a rotation direction of the second driving wheel 214B, etc.

In some embodiments, each of the plurality of stability wheels 212A, 212B, 212C, 212D comprise an encoder configured to measure movement of each of plurality of stability wheels 212A, 212B, 212C, 212D. As such, the system may be configured to accurately map the movement of the robotic base through data received from the encoders based on motion of plurality of stability wheels 212A, 212B, 212C, 212D In still other embodiments, the robotic driving base 210 comprises a suspension mechanism 265. In various embodiments, the suspension mechanism 265 comprises at least one or more first driving wheel support members 266, 268 and one or more second driving wheel support members 262, 264. In the embodiments shown in these figures, the one or more first driving wheel support members 266, 268 is operably coupled to the first driving wheel 214A. In some embodiments, the one or more second driving wheel support members 262, 264 is operably coupled to the second driving wheel 214B. In particular embodiments, the suspension mechanism 265 is configured to enable each of the first and second driving wheels 214A and 214B to suspend independently from the base frame 250. In this way, the first and second driving wheels 214A and 214B may be configured to move in a vertical direction independently from the plurality of support wheels. In various embodiments, this may enable the robotic base to travel over rougher surfaces, bumps, etc., while still maintaining a robot supported by the robotic base in a vertically upright position (e.g., such that the robotic base can still enable a paint robot, for example, to a paint a substantially vertical switch of paint).

In various embodiments, the base portion 110 further comprises at least one computer controller 114, configured to control one or more aspects of the operations of the autonomous mobile paint robot 100 described herein. Various features of the control systems of the autonomous mobile paint robot 100 are described more fully below.

Paint Caddy Assembly

As shown in FIGS. 1A and 1B, the autonomous mobile paint robot 100 further comprises a paint caddy assembly 130. As may be understood from this figure, the paint caddy assembly 130 comprises at least one paint container 132 (e.g., a bucket or other suitable housing for storing paint or other liquid). In some embodiments, the paint caddy assembly 130 comprises a pump configured to draw paint stored in the at least one paint container 132 and deliver the paint at pressure through a spray tip 156, such as the spray tip 156 discussed more fully below.

Paint Sprayer Support System

In particular embodiments, the paint robot 100 further comprises a paint sprayer support system 150 that comprises: (1) a first vertical support 152; (2) a second vertical support 154; and (3) a pivoting spray head 156. In particular embodiments, the first and second vertical supports 152, 154 are configured to slide relative to one another via a suitable joint (e.g., a prismatic joint) in a substantially telescoping (e.g., telescoping) manner. FIGS. 2A and 2B show the paint robot 100 with the second vertical support 154 in an extended position relative to the first vertical support 152. FIGS. 2A and 2B further depict the spray tip positioned at an upper end of the second vertical support. As may be understood from this figure, in various embodiments, the spray tip is configured to move vertically along the first and second vertical supports 152, 154 (e.g., via a second prismatic or other suitable joint, along a suitable track, etc.). In various embodiments, the paint sprayer support system comprises one or more motors configured to cause: (1) the second vertical support 154 to slide relative to the first vertical support 152; and (2) the spray tip 156 to slide vertically relative to both the first and second vertical supports 152, 154. In a particular embodiment, the system comprises two motors, or any other suitable number of motors configured to cooperate to cause the first and second vertical supports 152, 154 or other components of the paint robot to move relative to one another to enable the spray tip 156 (e.g., or spray tips) to spray a complete vertical swath of a wall (e.g., from floor to ceiling or from ceiling to floor).

In particular embodiments, the vertical support system comprises one or more linear motion carriages. In some embodiments, the vertical support system comprises any suitable number of linear motion carriages. In particular embodiments, the one or more linear motion carriages comprise the first and second vertical supports first vertical support, second vertical support. In some embodiments, each of the one or more linear motion carriages may be powered internally to each respective carriage (e.g., via one or more motorized wheels and/or gears that ride along one or more rails and are configured to propel each respective linear motion carriage). In still other embodiments, each of the one or more linear motion carriages may comprise any suitable combination of lead screws, cables, ropes, chains, gears, etc. affixed to each respective carriage).

In various embodiments, as may be understood from FIGS. 1A, 1B, 2A, and 2B, the spray tip 156 is configured to slide from a first position at a base of the paint robot 100 (e.g., at floor level) to a second position at an upper portion of the second vertical support 154. In this way, the spray tip 156, in any embodiment described herein, may be configured to paint a vertical swath of paint along this vertical path between the first and second positions. In particular embodiments, the spray tip 156 comprises a pressure activated valve, which may, for example, be configured to prevent leakage of paint of other liquid from the spray tip and providing a minimum pressure level of fluid to the spray tip orifice.

In particular embodiments, the spray tip 156 is disposed in a track defined by the second vertical support 154. In particular embodiments, the computer controller is configured to coordinate a velocity at which the second vertical support slides relative to the first vertical support 152 with the velocity at which the spray tip 156 slides relative to the second vertical support 154 such that the combined velocities are substantially constant (e.g., which may, for example, result in a more even application of paint along the vertical swath).

In various embodiments, the computer controller may be configured to repeat the steps above substantially in reverse (e.g., in order to paint a vertical swath that begins at the ceiling and ends at the floor, from the top of the wall to the bottom). The computer controller may then be configured to repeat the painting of upwards and downwards painted adjacent vertical swaths until the entire length (e.g., width) of the wall has been painted.

As may be understood from FIGS. 1A, 1B, 2A, and 2B, structural limitations of the automated mobile paint robot may limit the paint robot's ability to paint at least a portion of the wall adjacent the ceiling and the floor. In the embodiment shown in FIGS. 1A, 1B, 2A, and 2B, for example, a fixed sprayer 156 that is oriented such that the fan of the sprayer is substantially perpendicular (e.g., perpendicular) to the wall surface may be unable to reach the very top (e.g., adjacent the ceiling) and/or very bottom (adjacent the floor) portions of the wall. In some embodiments, such a limitation may result in a painted wall that has unpainted gaps between: (1) an upper limit of the paint sprayer's reach and the ceiling; and/or (2) a lower limit of the paint sprayer's reach and the floor.

In still other embodiments, a paint robot having a sprayer that is substantially fixed in an orientation in which the spray fan is perpendicular to the wall surface may be ineffective at painting portions of a wall that are not substantially flat (e.g., flat). These portions may include one or more protrusions and/or recesses such as, for example: (1) a chair rail or other suitable piece of molding; (2) one or more window ledges and/or sills; (3) one or more exit signs; (4) one or more thermostats; (5) etc. As such, it may be desirable to incorporate an articulating spray head (e.g., a pivoting sprayer) into an automated mobile painting system (e.g., such as the paint robot shown in FIGS. 1A, 1B, 2A, and 2B) in order to, for example, paint the upper and lower portions of the wall by angling the paint sprayer to paint over and/or under the various protrusions which may exist on the wall as discussed above.

FIG. 6 depicts a pivoting spray head according to a particular embodiment. As may be understood from FIG. 6, the pivoting sprayer may be configured to angle upwards or downwards with at least about a 180-degree range of motion. For example, in a particular embodiment, the pivoting spray head is configured to angle upwards at least about 90 degrees (e.g., 90 degrees) and downwards at least about 90 degrees (e.g., 90 degrees) from a position in which the pivoting spray head is substantially perpendicular to a surface being sprayed (e.g., a wall).

In particular embodiments, the pivoting spray head comprises a worm gear drive assembly that is configured to articulate the pivoting spray head to a desired angle. In some embodiments, the worm gear drive assembly is configured to articulate the spray head of a rate of at least about 60 RPM. In various embodiments, a computer controller is configured to operate the worm gear drive assemble to adjust the angle of the pivoting spray head relative to the paint robot (e.g., or wall). In still other embodiments, the pivoting spray head comprises any other suitable mechanism for adjusting an angle of the pivoting spray head (e.g., stepper motor, etc.).

In various embodiments, a computer controller is configured to programmatically adjust an angle of the pivoting spray head such that the pivoting spray head is configured to paint floors, ceilings, over and under protrusions, etc. In some embodiments, the computer controller is configured to cause the pivoting spray head to oscillate while painting in order to apply a texture to a painted surface.

In various embodiments, as shown in FIG. 6, a pivoting spray tip assembly 656 comprises a pivoting spray tip mount 610 configured to support a spray tip 156 that is configured to pivot about a pivoting spray tip pivot axis 615 defined by the pivoting spray tip mount 610. In various embodiments the pivoting spray tip mount 610 comprises a first pivoting spray tip support 612 and a second pivoting spray tip support 614 that each extend perpendicularly from the pivoting spray tip mount 610. In the embodiment shown in these figures the first pivoting spray tip support 612 is parallel to the second pivoting spray tip support 614. In some embodiments, the first pivoting spray tip support 612 and the second pivoting spray tip support 614 support opposing portions of the spray tip 156 and support the spray tip 156 adjacent the pivoting spray tip pivot axis 615. In some embodiments the pivoting spray tip pivot axis 615 comprises a suitable rod or other mechanism or mechanisms that extend(s) at least partially from each of the first pivoting spray tip support 612 and the second pivoting spray tip support 614. In some embodiments, the 665 further comprise a pivoting spray tip drive assembly 622, which may, for example, comprise a worm gear drive assembly (e.g., a or other suitable motor or drive assembly or combination of motors or drive assemblies) that is/are configured to articulate the pivoting spray head to a desired angle. In some embodiments, the worm gear drive assembly is configured to articulate the spray head of a rate of at least about 60 RPM. In still other embodiments, the pivoting spray tip assembly 656 comprises a pivoting spray tip controller assembly 620, which may include any suitable controller described herein.

Figure 7:
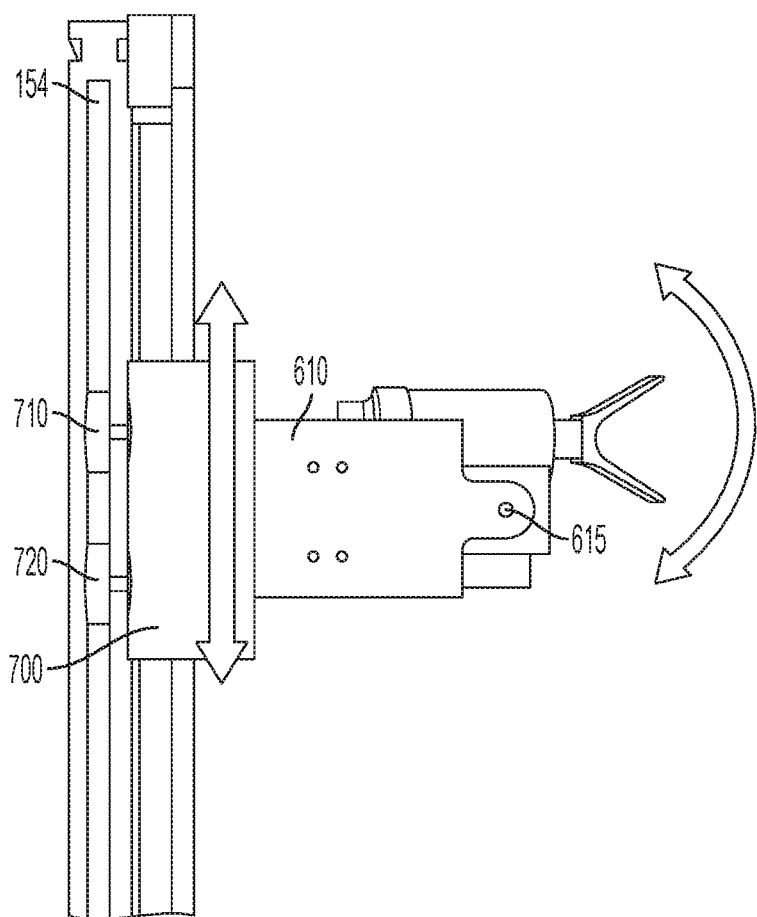
FIG. 7 depicts a pivoting spray head according to a particular embodiment mounted to a vertical support (e.g., such as any suitable vertical support depicted in FIGS. 1A, 1B, 2A, and/or 2B).

FIG. 7 depicts an additional side view of a pivoting spray head (e.g., wrist) affixed to a paint robot's vertical support 154 (e.g., tower) via a first linear motion carriage support 710 and a second linear motion carriage support 720. In various embodiments, the pivoting spray tip mount 610 is configured to slide vertically relative to the vertical support 154 via a linear motion carriage 700. In other embodiments, the pivoting spray tip mount 610 may be mounted to the vertical support using any other suitable mechanism configured to enable vertical sliding of the pivoting spray tip mount 610 relative to the vertical support.

Vertical Swath Painting with Pivoting Spray Head

Figure 9:
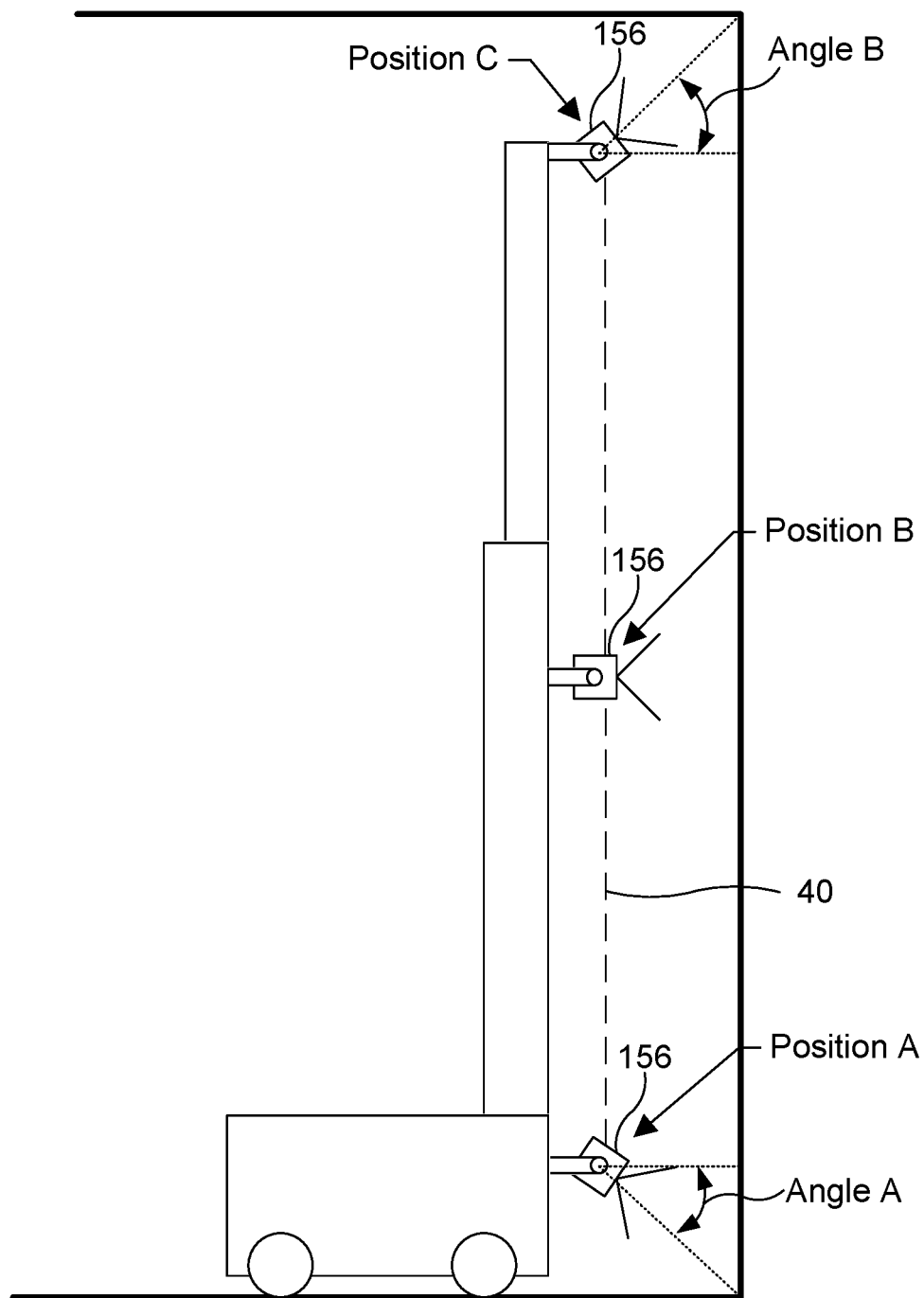
FIG. 9 depicts an illustrative example of the application of paint along a vertical swath using a pivoting spray head as described herein.

In various embodiments, as may be understood from FIG. 9, when painting along a particular vertical swath, the paint robot (e.g., a computer controller) may be configured to angle the pivoting spray head 156 upwards or downwards as necessary while painting a particular vertical swath in order to ensure that paint is applied to the upper and lower portion of the wall. The computer controller may, for example, angle the pivoting spray head by operating one or more of the motors and/or gears that are configured to adjust the angle of the spray head (e.g., such as those discussed above).

For example, when painting a vertical swath from floor to ceiling, with the pivoting spray head 156 beginning a Position A, the system may be configured to: (1) cause the pivoting spray head 156 to travel vertically along a linear path 40 through a combination of sliding of the second vertical support 154 and spray tip 156 as discussed above; and (2) cause the worm gear drive assembly (e.g., or other suitable mechanism) to angle the pivoting spray head 156 upward at any suitable point as the pivoting spray head 156 travels between Position A and Position C such that the pivoting spray head 156 forms Angle B with the surface of the wall.

In particular embodiments, the computer controller is configured to cause the pivoting spray head 156 to form Angle B with the wall after the pivoting spray head 156 has reached position C. In other embodiments, the computer controller is configured to begin causing the pivoting spray head 156 to angle upwards prior to the pivoting spray head 156 reaching Position C (e.g., at any suitable Position B between Position A and Position C). In such embodiments, the computer controller may be configured to cause the pivoting spray head 156 to reach Angle B with the wall at the time at which the pivoting spray head 156 reaches Position C. In still other embodiments, the computer controller is configured to angle the pivoting spray head 156 upwards to Angle B prior to the pivoting spray head 156 reaching Position C.

In any embodiment described herein, the system is configured to coordinate each of: (1) velocity (e.g., and acceleration) at which the second vertical support slides relative to the first vertical support 152; (2) the velocity (e.g., and acceleration) at which the spray tip 156 slides relative to the second vertical support 154; and (3) the angular velocity (e.g., and angular acceleration) at which the computer controller causes the pivoting spray head 156 to angle upwards or downwards such that the combined velocities are substantially consistent.

In particular embodiments, when painting a vertical swath from floor to ceiling, the pivoting spray head 156 may begin in an orientation in which the pivoting spray head 156 is positioned at Angle A with respect to the wall as shown in FIG. 9. In such embodiments, the computer controller may be further configured to cause the worm gear drive assembly (e.g., or other suitable mechanism) to angle the pivoting spray head 156 upward as the pivoting spray head 156 travels between Position A and Position C such that the pivoting spray head 156 articulates from Angle A to Angle B in any suitable manner between Position A and Position C. For example, in particular embodiments, the pivoting spray head 156 may: (1) articulate from Angle A to an angle that is perpendicular to the wall as the pivoting spray head travels vertically along the linear path 40; (2) remain in an orientation that is perpendicular to the wall (e.g., as shown in Position B) for at least a portion of its travel along the linear path 40; and (3) articulate from the angle that is perpendicular to the wall to Angle B at least as the pivoting spray head 156 arrives at Position C.

In other embodiments, the pivoting spray head 156 may begin in a position in which the pivoting spray head 156 is substantially perpendicular (e.g., perpendicular) to the wall at the beginning of the vertical swath (e.g., while at Position A).

Figure 8:
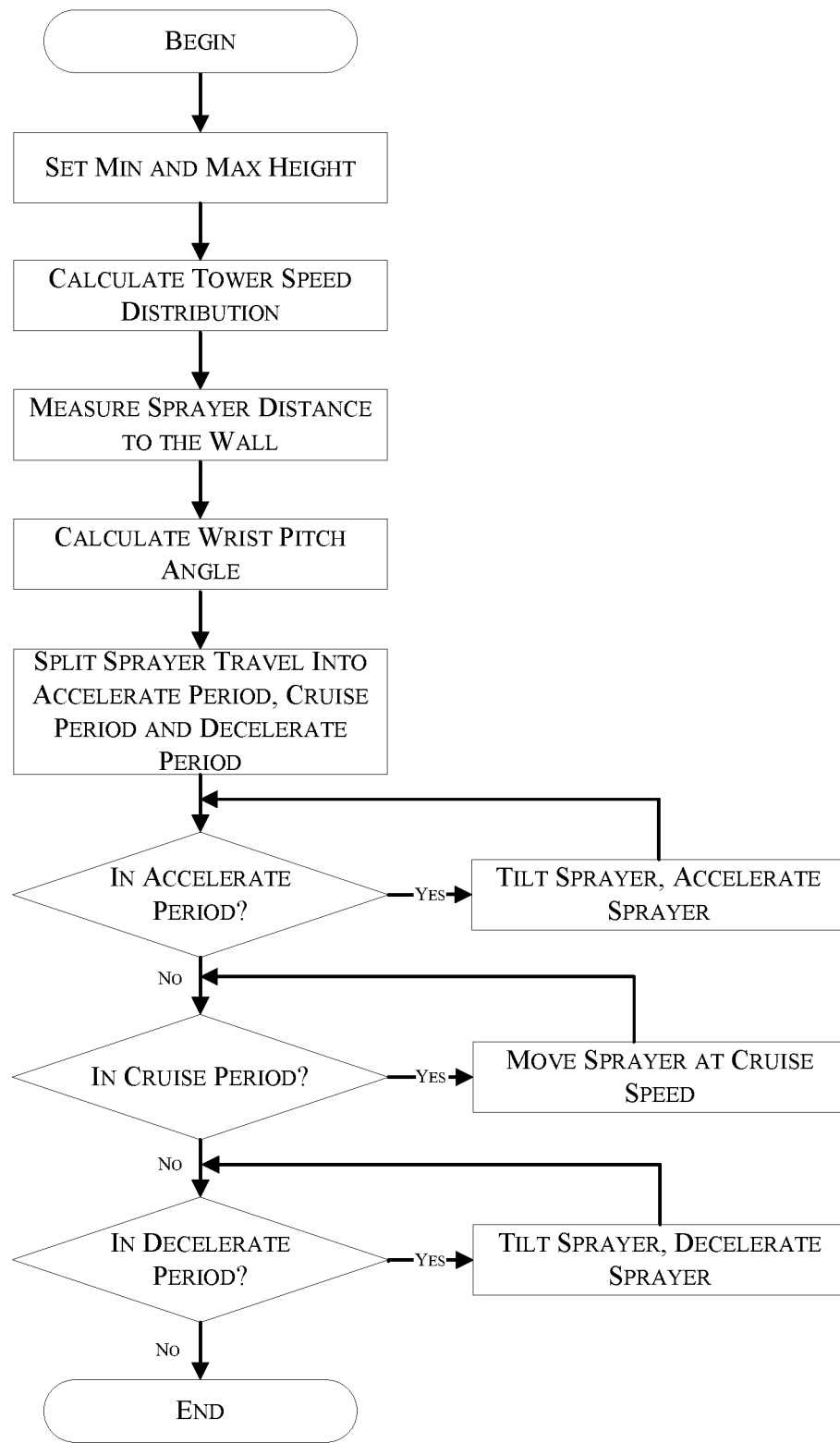
FIG. 8 depicts operations performed by a computer controller or other system or control system in order to control the operation of the pivoting spray head according to various embodiments.

FIG. 7 depicts an additional side view of a pivoting spray head (e.g., wrist) affixed to a paint robot's vertical support (e.g., tower). FIG. 6 depicts exemplary operations which may be performed by a computer controller or similar system in order to utilize the pivoting spray head in the application of paint. In particular embodiments, a computer controller may be configured to perform one or more operations shown in FIG. 8. For example, the computer controller (e.g., or other system) may begin by setting a minimum and maximum painting height. The system may, for example, determine minimum and maximum height based on a height of a ceiling for the wall being painted. In particular embodiments, the system may be configured to determine the minimum and maximum heights using one or more imaging devices, one or more proximity sensors, etc.

In various embodiments, the system is then configured to measure a distance from the sprayer to the wall being painted. The system may, for example, use any suitable range-finger, IR sensor, or other suitable distance sensor to determine the distance. In various embodiments, the system is then configured to determine the pitch angle described above based on the offset from the wall, the ceiling height, and known dimensions of the sprayer and/or vertical supports.

In various embodiments, the system is configured to split the vertical motion of the sprayer into at least three travel periods: (1) a first acceleration period; (2) a second cruising period; and (3) a third deceleration period. During the first acceleration period, the system (e.g., controller) is configured to cause the spray head to accelerate the sprayer to the desired speed along the vertical path (e.g., through a combination of linear movement of at least one of the second vertical support and spray head along the second vertical support) and cause the spray head to tilt from a minimum angle (e.g., Angle A) to an angle perpendicular to the wall. During the second cruising period, the controller may be configured to cause the spray head to travel along the vertical path at a constant velocity (e.g., through a combination of linear movement of at least one of the second vertical support and spray head along the second vertical support) with the pivoting spray head maintaining a fixed angle perpendicular to the wall. During the third deceleration period, the controller is configured to cause the spray head to decelerate the sprayer from the desired speed along the vertical path to a stop (e.g., through a combination of linear movement of at least one of the second vertical support and spray head along the second vertical support) and cause the spray head to tilt from an angle perpendicular to the wall to a maximum angle (e.g., Angle B). In any embodiment described herein, the controller is configured to cause the sprayer to spray a fan of paint along a vertical section of wall at a substantially constant (e.g., constant) velocity (e.g., through any suitable combination of coordination of linear and angular acceleration and velocity of the spray head described herein).

When painting a vertical swath from ceiling to floor, the system may be configured to perform similar steps to those described above in reverse such that the computer controller is configured to: (1) cause the pivoting spray head 156 to travel vertically along the linear path 40 through a combination of sliding of the second vertical support 154 and spray tip 156 as discussed above from Position C to Position A; and (2) cause the worm gear drive assembly (e.g., or other suitable mechanism) to angle the pivoting spray head 156 downward at any suitable point as the pivoting spray head 156 travels between Position C and Position A such that the pivoting spray head 156 forms Angle A with the surface of the wall.

In still other embodiments, a paint robot may be configured to angle the pivoting spray head 156 upwards and/or downwards as necessary to paint any of the various protrusions and/or recesses described herein as the paint robot is painting a particular vertical swath. In such embodiments, the computer controller may be configured to manipulate an orientation of the pivoting spray head in any suitable manner as the pivoting spray head travels along the linear path 40 in order to sufficiently paint such protrusions and/or recesses.

Exemplary Technical Platforms

As will be appreciated by one skilled in the relevant field, various aspects of the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems), and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

Figure 10:
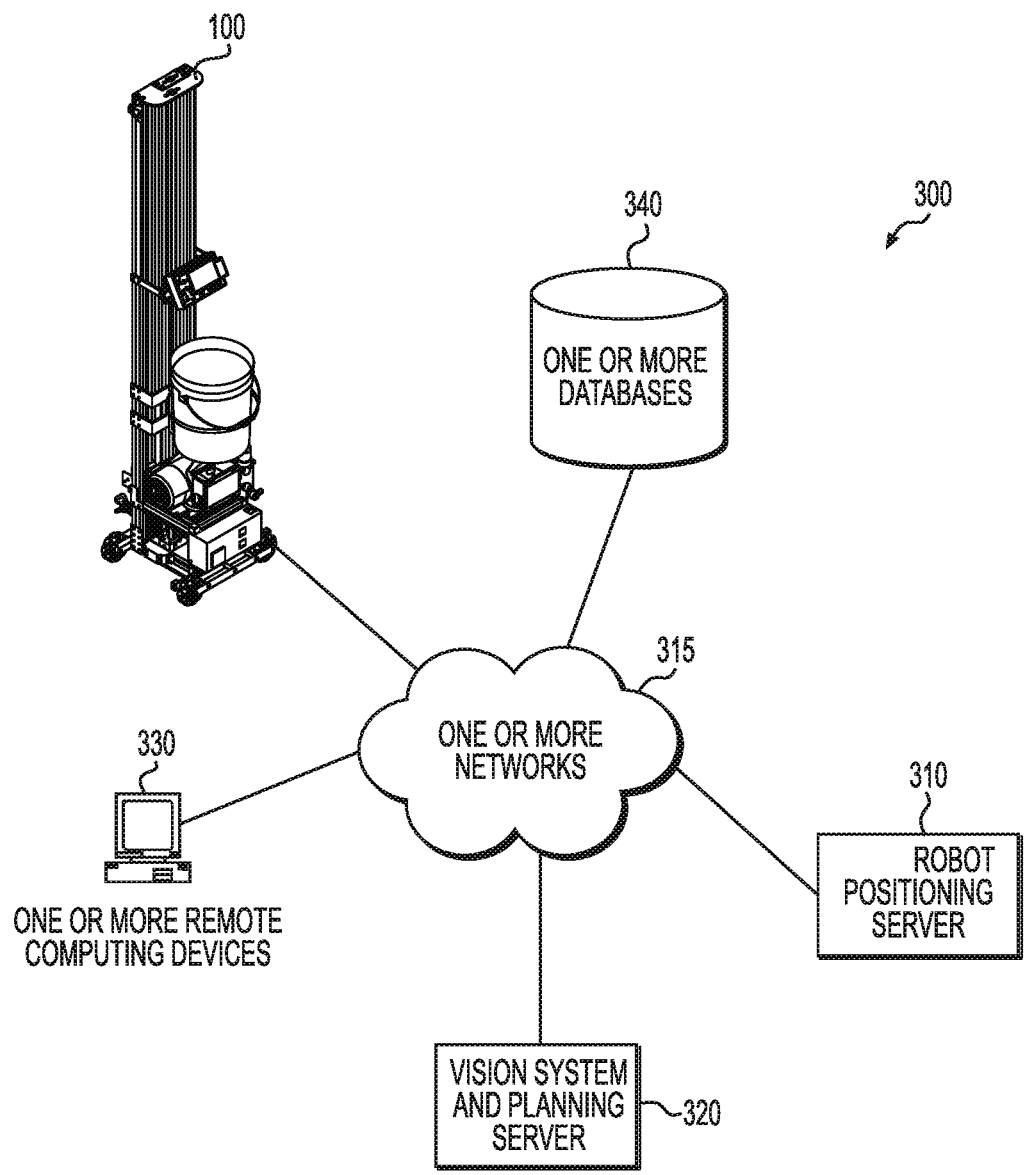
FIG. 10 depicts a robot control system 300 according to various embodiments.

FIG. 10 is a block diagram of a robot control system 300 according to a particular embodiment. In some embodiments, the robot control system 300 is configured to coordinate the planning and execution of one or more actions by an autonomous mobile paint robot 100 (e.g., or other robot such as any suitable robot that includes any suitable robotic base described herein) in order to complete the painting of a particular surface, room, or other function, etc.

As may be understood from FIG. 10, the robot control system 300 includes one or more computer networks 315, an autonomous mobile paint robot 100 (e.g., or other robot having a robotic driving base), a robot positioning server 310, a vision system and planning server 320, one or more remote computing devices 330 (e.g., such as a desktop computer, laptop computer, tablet computer, smartphone, etc.), and one or more databases 340. In particular embodiments, the one or more computer networks 315 facilitate communication between the autonomous mobile paint robot 100, one or more remote computing devices 330 (e.g., a desktop computer, laptop computer, tablet computer, etc.), and one or more databases 340.

The one or more computer networks 315 may include any of a variety of types of wired or wireless computer networks such as the Internet, a private intranet, a public switch telephone network (PSTN), or any other type of network. The communication link between the paint robot positioning server 310 and database 340 may be, for example, implemented via a Local Area Network (LAN) or via the Internet.

Figure 11:
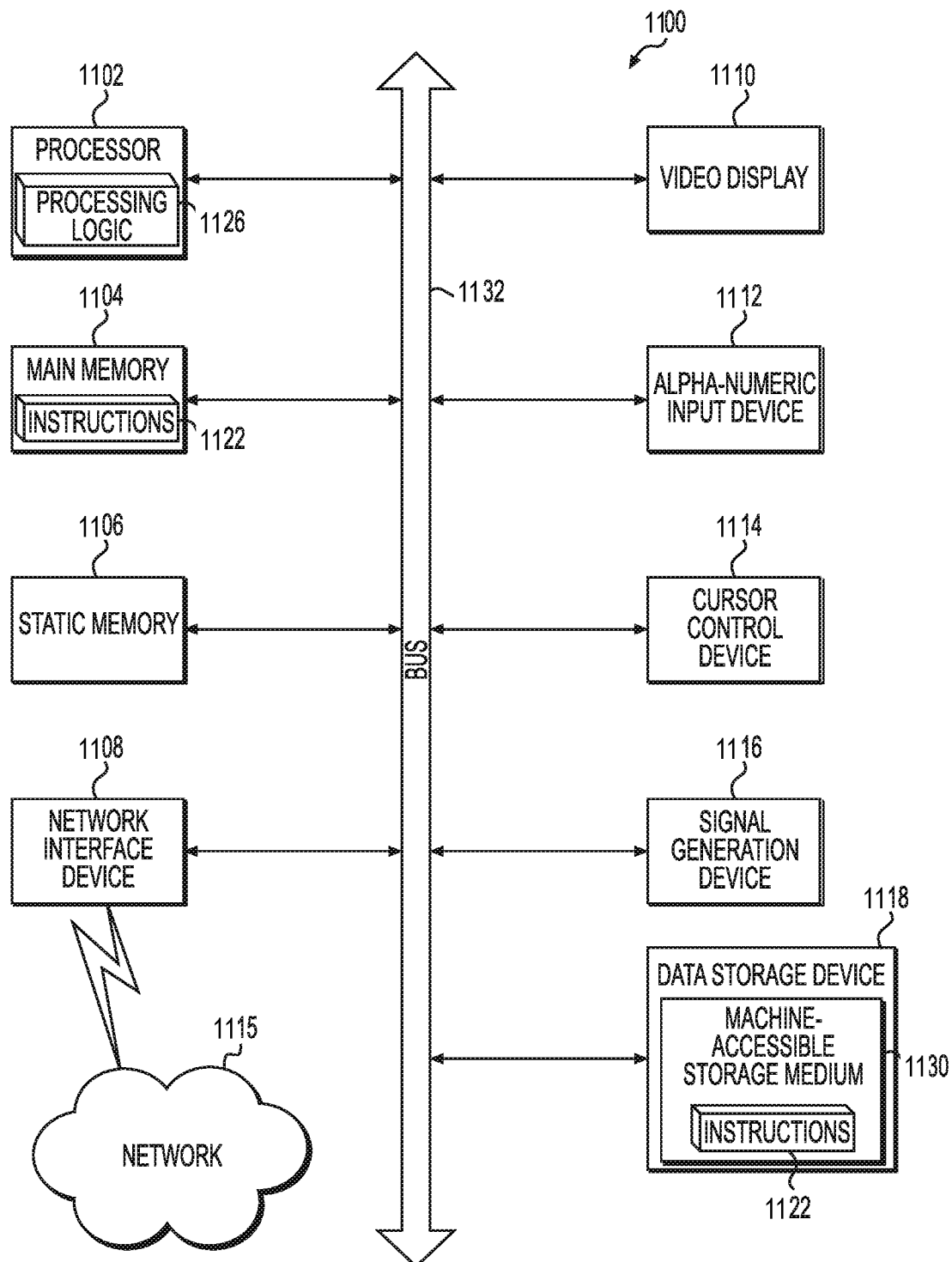
FIG. 11 is a schematic diagram of a computer (such as the robot positioning server 310, or one or more remote computing devices 330) that is suitable for use in various embodiments of the robot control system 300 shown in FIG. 10.

FIG. 11 illustrates a diagrammatic representation of a computer 1100 that can be used within the robot control system 300, for example, as a client computer (e.g., one or more remote computing devices 130 shown in FIG. 10), or as a server computer (e.g., robot positioning server 310 shown in FIG. 10), or one or more computer controllers on the autonomous mobile paint robot 100 itself (e.g., such as one of the one or more distributed controllers for controlling one or more motors to power the plurality of wheels 112, the paint sprayer, any driving wheels described herein, etc.). In particular embodiments, the computer 1100 may be suitable for use as a computer within the context of the robot control system 300 that is configured to receive data input (e.g., movement information from one or more wheel encoders, generate a virtual room plan, generate a queue or stack of moves for the paint robot 100 to perform, and operate the paint robot 100 or robotic base to perform those moves (e.g., by causing movement of one or more vertical supports through the operation of one or more motors, etc).

In particular embodiments, the computer 1100 may be connected (e.g., networked) to other computers in a LAN, an intranet, an extranet, and/or the Internet. As noted above, the computer 1100 may operate in the capacity of a server or a client computer in a client-server network environment, or as a peer computer in a peer-to-peer (or distributed) network environment. The Computer 1100 may be a personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), static memory 1106 (e.g., flash memory, static random access memory (SRAM), etc.), and a data storage device 1118, which communicate with each other via a bus 1132.

The processing device 1102 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 may be configured to execute processing logic 1126 for performing various operations and steps discussed herein. In various embodiments, the processing device 1102 (e.g., or processing devices) may be embodied as any suitable computer processor, controller, etc. described herein.

The computer 1100 may further include a network interface device 1108. The computer 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a non-transitory computer-accessible storage medium 1130 (also known as a non-transitory computer-readable storage medium or a non-transitory computer-readable medium) on which is stored one or more sets of instructions (e.g., software instructions 1122) embodying any one or more of the methodologies or functions described herein. The software instructions 1122 may also reside, completely or at least partially, within main memory 1104 and/or within processing device 1102 during execution thereof by computer 1100—main memory 1104 and processing device 1102 also constituting computer-accessible storage media. The software instructions 1122 may further be transmitted or received over a network 1115 via network interface device 1108.

While the computer-accessible storage medium 1130 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, while the above robot is discussed particular in regard to paint, it should be understood that various other embodiments may be configured to apply any other liquid to any other suitable surface using any of the techniques described herein. For example, it should be understood that other embodiments may utilize any suitable technique described herein to apply any other suitable material (e.g., either singularly or additively). These other materials may include, for example, stucco, cement, gunite, one or more plastics, insulation, foam, or other suitable materials. In various other embodiments, one or more techniques described herein may be utilized for the application of any other suitable material such as, for example, a solid material (e.g., a powder, sand, glitter, pellets such as BBs etc.), semi-solid material, a molten material, gaseous material, plasma, textured material, solid suspended in a liquid, etc. The system may, for example be utilized to apply any material in any suitable location regardless of a density, consistency, or other property of the material.

In various embodiments, the system is configured to utilize the robotic driving base 210 or any suitable technique herein to apply any suitable material under pressure (e.g., through an orifice, via a suitable mold, etc.). In particular embodiments, the system is configured to atomize a material for application. In other embodiments, the system is configured to apply the material in its substantially natural state. In still other embodiments, the system is configured to apply one or more materials in a suitable matrix. In some embodiments, the system is configured to utilize one or more techniques described herein in a suitable 3-D printing application (e.g., portable and/or large-scale 3-D printing).

Furthermore, any combination of any features may be utilized in the context of any specific embodiment. For example, although one or more features may not be discussed in relation to one another, various embodiments of a paint robot may utilize any feature of component described herein in any combination. Furthermore, although various embodiments are described in the context of a paint robot, it should be understood that various features described may be implemented in any other suitable context (e.g., gantry system, etc.) or for any other construction robotics applications (e.g., in the context of a drywall mounting robot, or other autonomous construction robot). Although specific terms are employed herein, they are used in a generic and descriptive sense only and not for the purposes of limitation.

appended claims. For example, while the above robot is discussed particular in regard to paint, it should be understood that various other embodiments may be configured to apply any other liquid to any other suitable surface using any of the techniques described herein. For example, it should be understood that other embodiments may utilize any suitable technique described herein to apply any other suitable material (e.g., either singularly or additively). These other materials may include, for example, stucco, cement, gunite, one or more plastics, insulation, foam, or other suitable materials. In various other embodiments, one or more techniques described herein may be utilized for the application of any other suitable material such as, for example, a solid material (e.g., a powder, sand, glitter, pellets such as BBs etc.), semi-solid material, a molten material, gaseous material, plasma, textured material, solid suspended in a liquid, etc. The system may, for example be utilized to apply any material in any suitable location regardless of a density, consistency, or other property of the material.

In various embodiments, the system is configured to utilize the robotic driving base 210 or any suitable technique herein to apply any suitable material under pressure (e.g., through an orifice, via a suitable mold, etc.). In particular embodiments, the system is configured to atomize a material for application. In other embodiments, the system is configured to apply the material in its substantially natural state. In still other embodiments, the system is configured to apply one or more materials in a suitable matrix. In some embodiments, the system is configured to utilize one or more techniques described herein in a suitable 3-D printing application (e.g., portable and/or large-scale 3-D printing).

Furthermore, any combination of any features may be utilized in the context of any specific embodiment. For example, although one or more features may not be discussed in relation to one another, various embodiments of a paint robot may utilize any feature of component described herein in any combination. Furthermore, although various embodiments are described in the context of a paint robot, it should be understood that various features described may be implemented in any other suitable context (e.g., gantry system, etc.) or for any other construction robotics applications (e.g., in the context of a drywall mounting robot, or other autonomous construction robot). Although specific terms are employed herein, they are used in a generic and descriptive sense only and not for the purposes of limitation.

What is claimed is:

1. A zero turn-radius robotic base comprising:
   a substantially rectangular base frame;
   a plurality of stability wheels disposed adjacent an outer face of the substantially rectangular base frame;
   a first driving wheel disposed at least partially within the substantially rectangular frame; and
   a second driving wheel disposed at least partially within the substantially rectangular frame and spaced apart from the first driving wheel, wherein:
      the first driving wheel is spaced apart from a center of rotation of the substantially rectangular base frame and has a first axis of rotation that intersects the center of rotation;
      the second driving wheel is spaced apart from the center of rotation of the substantially rectangular base frame and has a second axis of rotation that intersects the center of rotation; and
      the first axis of rotation is substantially colinear with the second axis of rotation.

2. The zero turn-radius robotic base of claim 1, wherein the substantially rectangular base frame is configured to turn with a zero-turn radius through coordinated operation of the first drive wheel and the second drive wheel.

3. The zero turn-radius robotic base of claim 1, wherein the substantially rectangular base frame comprises:
   a front base frame member;
   a first side base frame member that extends perpendicularly from the front base frame member from a first end of the front base frame member;
   a second side base frame member that extends perpendicularly from the front base frame member from a second end of the front base frame member and is parallel to the first side base frame member; and
   a rear base frame member that extends between respective ends of the first side frame member and the second side base frame member and is parallel to the front base frame member.

4. The zero turn-radius robotic base of claim 3, wherein the first axis of rotation and the second axis of rotation are substantially parallel to the first side base frame member and the second side base frame member.

5. The zero turn-radius robotic base of claim 4, wherein the plurality of stability wheels comprise:
   a first stability wheel disposed on an outer face of the first side base frame member adjacent the front base frame member;
   a second stability wheel disposed on the outer face of the first side base frame member adjacent the rear base frame member;
   a first stability wheel disposed on an outer face of the first side base frame member adjacent the front base frame member; and
   a second stability wheel disposed on the outer face of the first side base frame member adjacent the rear base frame member.

6. The zero turn-radius robotic base of claim 5, wherein:
   the substantially rectangular base frame comprises a first stability wheel mount that extends perpendicularly from the outer face of the first side base frame member; and
   the first stability wheel mount is configured to support the first stability wheel adjacent the outer face of the first side base frame member adjacent the front base frame member.

7. The zero turn-radius robotic base of claim 5, wherein the first stability wheel, the second stability wheel, the third stability wheel, and the fourth stability wheel are substantially free spinning.

8. The zero turn-radius robotic base of claim 7, wherein the first stability wheel, the second stability wheel, the third stability wheel, and the fourth stability each comprise an omni wheel configured to move in all directions.

9. The zero turn-radius robotic base of claim 8, the zero turn-radius robotic base further comprising:
   a first driving wheel drive motor operably coupled to the first driving wheel;
   a first motor controller operably coupled to the first driving wheel drive motor;
   a second driving wheel drive motor operably coupled to the second driving wheel; and
   a second motor controller operably coupled to the second driving wheel drive motor, wherein:
      the first motor controller is configured to operate the first driving wheel drive motor to drive rotation of the first driving wheel; and
      the second motor controller is configured to operate the second driving wheel drive motor to drive rotation of the second driving wheel.

10. The zero turn-radius robotic base of claim 9, wherein:
    the zero turn-radius robotic base further comprises a suspension mechanism;
    each of the first driving wheel and the second driving wheel are mounted via the suspension mechanism such that the first driving wheel and the second driving wheel have a suspension that is independent from each of the plurality of support wheels.

* * * * *